US005190271A

United States Patent [19]

Otterbein, II

[11] Patent Number: 5,190,271

[45] Date of Patent: Mar. 2, 1993

[54] MULTI-PURPOSE HOLD-DOWN CLAMP

[76] Inventor: Henry C. Otterbein, II, 653 Hidden Point La., Cincinnati, Ohio 45230

[21] Appl. No.: 830,782

[22] Filed: Feb. 3, 1992

Related U.S. Application Data

[63] Continuation of Ser. No. 590,887, Oct. 1, 1990, abandoned.

[51] Int. Cl.[5] ............ B23Q 3/02

[52] U.S. Cl. ............ 269/91

[58] Field of Search ............ 83/409, 466, 451, 452; 269/45, 71, 73, 99-100, 91-94, 303, 304, 305, 309, 315

[56] References Cited

U.S. PATENT DOCUMENTS

| | | | |
|---|---|---|---|
| 568,543 | 9/1896 | Parks | 269/45 |
| 1,026,475 | 5/1912 | Tarbuck | 269/100 |
| 1,318,688 | 10/1919 | Paschall | 269/99 |
| 4,020,742 | 5/1977 | Raymond | 269/71 |
| 4,441,394 | 4/1984 | Barsotti | 83/409 |

*Primary Examiner*—Robert C. Watson
*Attorney, Agent, or Firm*—Frost & Jacobs

[57] ABSTRACT

A hold down clamp for a workpiece comprising a plate-like base having planar top and bottom surfaces, and forward, rearward and side edges. An abutment means extends transversely of the upper surface near the rearward edge thereof. A vertical clamping screw support of inverted L-shape is mounted centrally of the base side edges between the abutment means the base rearwad edge. The free end of the support contains a vertical internally threaded bore. A vertical clamping screw is engaged in the bore and supports a clamping head with a clamping surface adaped to cooperate with the base top surface. The clamp may be removably affixed to a work surface or shifted in free floating manner there along. The clamp base bottom surface has an axial slot, extending from the base forward edge through the base rearward edge, for use when the clamp is to be shifted in guided fashion along a power tool table having a guide slot. A T-guide is provided comprising upper and lower bars joined together. The lower bar is slidably receivable in the guide slot of the tool table, and the upper bar is slidably receivable in the clamp base slot, giving the clamp a first path of travel along the tool table determined by the lower bar and its slot, and a second path of travel determined by the upper bar and its slot. The clamp may be provided with a support and balance board to laterally extend the base.

19 Claims, 4 Drawing Sheets

MULTI-PURPOSE HOLD-DOWN CLAMP

This is a continuation of application Ser. No. 07/590,887, filed Oct. 1, 1990 now abandoned.

TECHNICAL FIELD

The invention relates generally to multi-purpose hold down clamps, and is more particularly directed to such a clamp which can serve as a fixed clamp, a free floating clamp or a guided clamp on a power tool table having a guide slot. In the latter instance the clamp has two distinct guided paths of travel.

BACKGROUND OF THE INVENTION

Prior art workers have devised many types of hold down clamps. Examples of prior art hold down clamps are taught in U.S. Pat. Nos. 2,085,235; 2,759,503; 2,785,709 and 4,658,686. While the prior art hold down clamps serve their purpose well, they are generally directed to a single function, or a limited number of functions and therefore lack versatility.

The present invention is directed to a multi-purpose hold down clamp which is extremely simple in construction and easy to manufacture. At the same time, however, the hold down clamp is capable of a number of modes of use. For example, the hold down clamp may be removably screwed or bolted to a work surface, serving as a stationary clamp. The clamp is provided with a planar base and is capable of being manually shifted in any direction along a work surface or power tool table in a free floating manner.

Many of the prior art hold down clamps are provided with guide bars which are adapted to be received in the guide slot of the table of a power tool. Many of these prior art clamps will not function without a guide bar. The guide bar is adapted to be slidably received in the guide slot in the tool table and the guide bar and guide slot determine a single rectilinear path of travel for the hold down clamp. As a result of this, such hold down clamps are not suitable for sanding and drilling operations.

The hold down clamp of the present invention is provided with a removable T-guide comprising a pair of rectilinear bars joined together one above the other. For example, the bars of the T-guide may be permanently joined together at right angles with respect to each other. In this instance, the lower guide bar is adapted to be slidably received in guide slot of the tool table and the upper guide bar is adapted to be received in a central longitudinal slot formed in the base of the hold down clamp, itself. This arrangement permits the hold down clamp of the present invention to have two distinct guided rectilinear paths of travel. The first path of travel is determined by the sliding movement of the lower bar of the T-guide in the guide slot of the tool table. The second rectilinear guided path of travel is determined by the upper bar of the T-guide slidably mounted in the slot of the base of the hold down clamp. This enables the hold down clamp of the present invention to be used with the table of a band saw or a belt, disc or edge sander, having at least one guide slot formed in the table. This will be further and fully explained hereinafter.

The upper and lower bars of the T-guide may be joined together by a flathead machine screw in an adjustable fashion. For example, the upper bar of the T-guide may be oriented with respect to the lower bar from a position wherein the upper bar is perpendicular to the lower bar, through a range of oblique angles, to a position wherein the upper bar is parallel to and overlies the lower bar. When this is the case, the hold down clamp of the present invention is not only capable of two distinct rectilinear guided paths of travel, but the second rectilinear guided path of travel is adjustable with respect to the first. Again, this will be fully described hereinafter.

From the above, it will be apparent that the multi-purpose hold down clamp of the present invention is capable of a number of modes of use. Moreover, when the hold down clamp is used in conjunction with the T-guide and a tool table provided with at least one guide slot, the hold down clamp will be capable of two distinct rectilinear paths of travel. Furthermore, if desired, the second rectilinear guided path of travel may be adjustable with respect to the first. The hold down clamp may be used with a single workpiece, or multiple workpieces which are to be identically cut or sanded. The word, "workpiece," as used herein and in the claims, should be considered to refer to a single piece or multiple pieces.

SUMMARY OF THE INVENTION

According to the invention there is provided a multi-purpose hold down clamp for a workpiece. The clamp of the preferred embodiment comprises a plate-like base having planar top and bottom surfaces, a forward edge, a rearward edge and side edges. An abutment means with a forwardly facing vertical abutment surface extends transversely of the top surface of the base near the rearward edge thereof. A vertical clamping screw support of inverted L-shape is mounted centrally of the side edges of the base between the abutment means and said base rearward edge. The clamping screw support has a vertical portion extending upwardly from said base and terminating at its upper end in a forwardly extending horizontal portion. The horizontal portion has an enlarged free end containing a vertical, internally threaded bore. A vertical clamping screw is engaged in the support bore. The clamping screw, at its lowermost end, is provided with a clamping head having a clamping surface adapted to cooperate with the base top surface. The clamping head surface is shiftable toward and away from the base top surface by appropriate rotation of the clamping screw.

The base bottom surface has an axial slot formed therein extending from the base forward edge through the base rearward edge. A T-guide comprises upper and lower bars joined together. The lower bar of the T-guide is slidably receivable in a guide slot in the table of a power tool or the like. The upper bar is slidably receivable in the base slot, thereby giving the clamp a first guided rectilinear path of travel along the tool table as determined by the lower bar and the table guide slot, and a second guided rectilinear path of travel determined by the upper bar and the slot in the clamp base. The upper bar of the T-guide may be permanently fixed to the lower bar whereby the direction of the second path of travel is fixed with respect to the direction of the first path of travel. Alternatively, the upper bar may be rotatively affixed to the lower bar by a flathead machine screw. The upper bar can be fixed with respect to the lower bar by the flathead machine screw at any position with respect to the lower bar from perpendicular thereto, through a range of oblique angles, to parallel thereto, wherein the upper bar overlies the lower bar.

As a result, the direction of the second path of travel can be adjustable with respect to the direction of the first path of travel from perpendicular thereto, through a range of oblique angles thereto, to parallel thereto, wherein the first and second paths of travel are the same.

The hold down clamp of the present invention may be provided with a support and balance board to laterally extend the size of the base. The lower surface of the clamp base being planar and free from downwardly depending obstructions, enables the clamp to be manually shifted in any direction along a work surface in a free floating manner. Finally, means are provided in association with the clamp base whereby the clamp base may be removably affixed to a work surface, the clamp serving as a stationary clamp.

As will be realized, the invention is capable of other different embodiments, and its several details are capable of modification in various obvious aspects all without departing from the invention. Many of these different embodiments will become apparent to those skilled in the art, from the following description wherein the preferred embodiment is shown and described by way of illustration. The drawings and descriptions shall thus be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of In the drawings.

Figure 1:
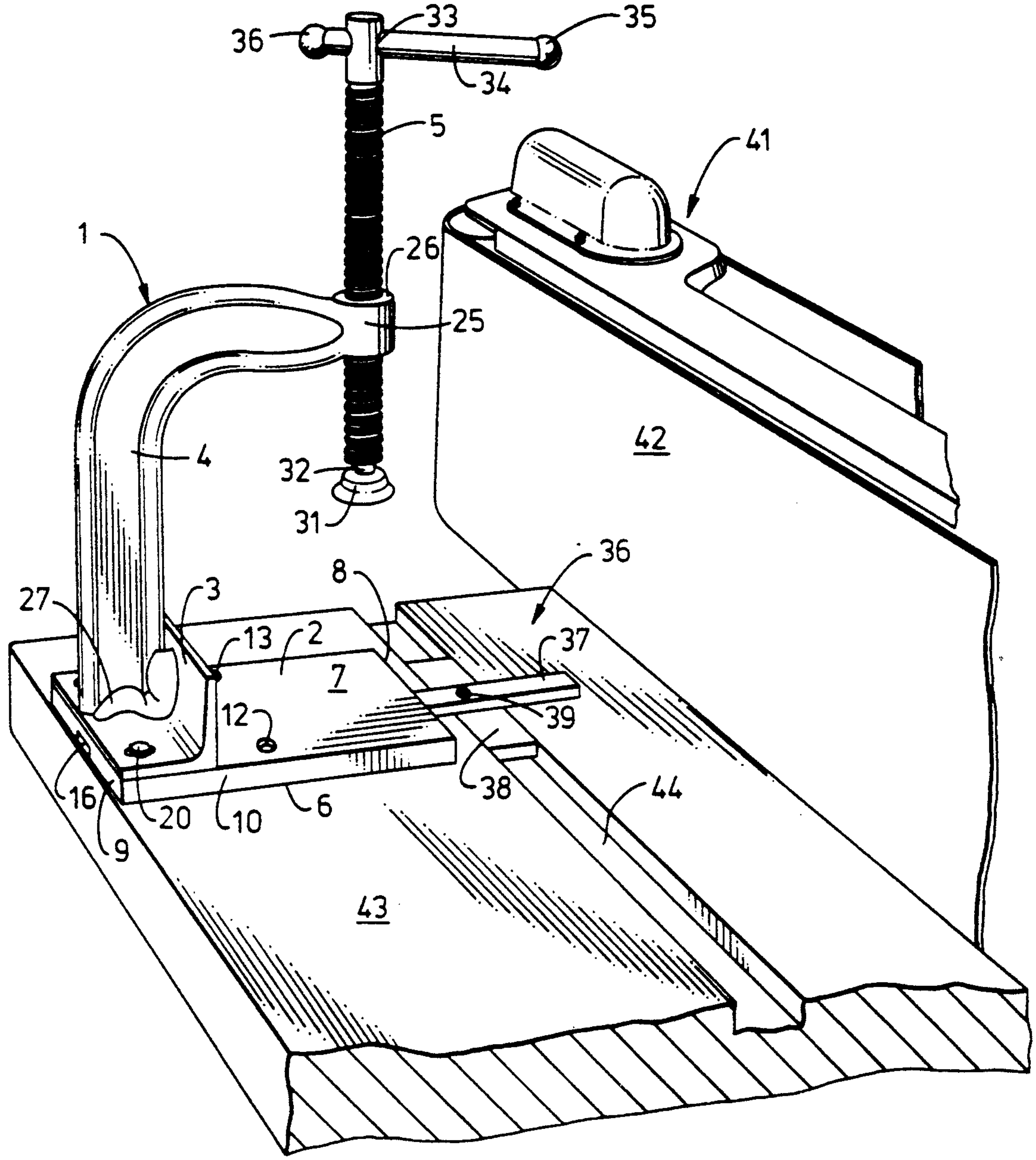
FIG. 1 is a fragmentary perspective view of the multi-purpose hold down clamp of the present invention, and its T-guide located on the table of a powered belt edge sander.
Figure 2:
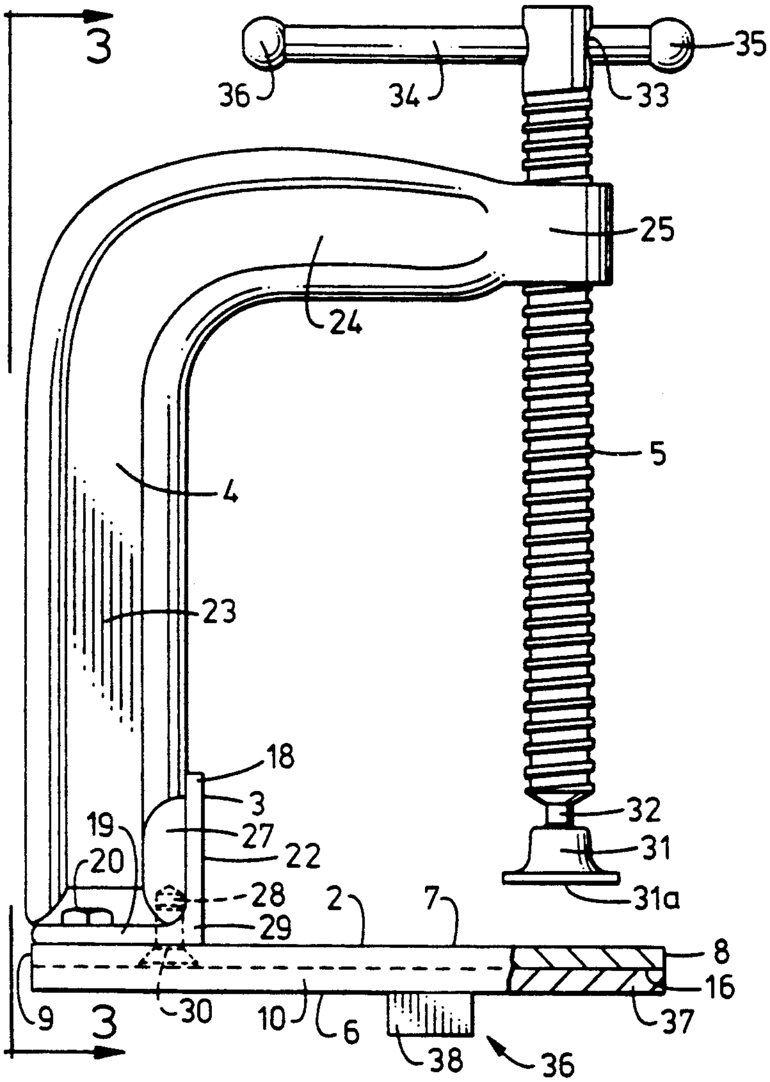
FIG. 2 is a side elevational view of the hold down clamp and the T-guide.
Figure 3:
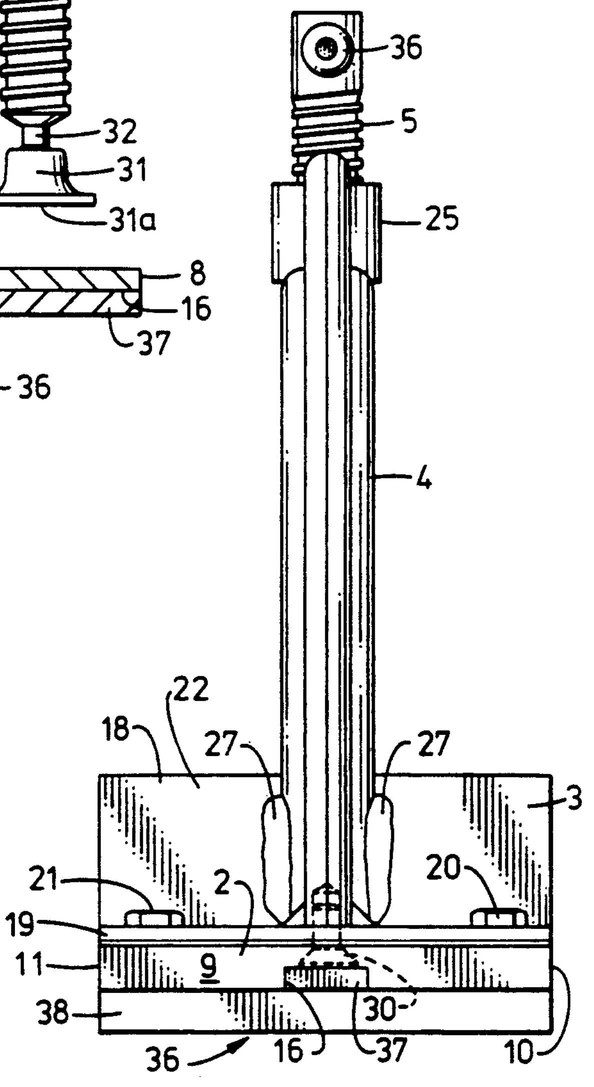
FIG. 3 is a rear elevational view of the hold down clamp and T-guide, as seen from line 3—3 of FIG. 2.

Reference will now be made in detail to the present preferred embodiment of the invention, an example of which is illustrated in the accompanying drawings.

DETAILED DESCRIPTION OF THE PREFERRED EMBODIMENT

In all of the Figures like parts have been given like index numerals. Reference is first made to FIGS. 1–4. The multi-purpose hold down clamp of the present invention is generally indicated at 1. The clamp comprises a base 2, an abutment member 3, a clamping screw support 4 and a clamping screw 5.

The base comprises a metallic plate-like member having a planar bottom surface 6, a planar top surface 7, a forward edge 8, a rearward edge 9 and side edges 10 and 11. Lower surface 6 and upper surface 7 are parallel.

While the base 2 may have any appropriate peripheral configuration, for purposes of an exemplary showing it is illustrated as being rectangular with the distance between its front edge 8 and its rear edge 9 being greater than the distance between its side edges 10 and 11. The base is provided with a pair of perforations 12 and 13 (see FIGS. 1 and 4), each having a countersink in the upper base surface 7. The base 2 is provided with a second pair of perforations 14 and 15 near its rearward corners. The perforations 14 and 15 are internally threaded.

A slot 16 is formed in the bottom surface 6 of base 2. The slot extends centrally and longitudinally of the base from its forward edge 8 through its rearward edge 9. Near its rearward end, the slot 16 is provided with a countersunk bore 17. The purposes of perforations 12-15, slot 16 and bore 17 will be apparent hereinafter.

The abutment member 3 comprises an angle iron having a vertical leg 18 and a horizontal leg 19. The horizontal leg 19 rests upon the upper surface 7 of base 2 and extends transversely thereof. The horizontal leg 19 extends toward the rearward edge 9 of base 2 with its outermost edge being substantially coplanar with the rearward edge 9. The abutmen member horizontal leg 19 is provided with a pair of perforations (not shown) which, when the abutment member 3 is properly located on base 2, are coaxial with the threaded perforations 14 and 15 of the base. The abutment member perforations are adapted to receive bolts 20 and 21 which threadedly engage in base perforations 14 and 15, respectively, to fixedly mount the abutment member 3 on base 2. The perforations in horizontal leg 19 are preferably elongated transversely of horizontal leg 19 to enable final adjustment of abutment member 3 with respect to base 2. The vertical leg 18 of the abutment member 3 provides a vertical abutment surface 22, adapted to be contacted by the workpiece to maintain proper alignment thereof.

The clamping screw support 4 comprises an inverted L-shaped metallic member having a vertical portion 23 and a horizontal portion 24. The free end of horizontal portion 24 terminates in a cylindrical portion 25. The cylindrical portion 25 is provided with a vertical threaded bore 26 (see FIG. 1). It will be noted that the clamping screw support 4 is similar to a conventional C-clamp body with that leg carrying the stationary abutment surface removed.

The lower end of the clamping screw support 4 is welded to the abutment member 3 as at 27. The lower end of the clamping screw support 4 may be provided with a vertical threaded bore 28 (see FIG. 2) and the abutment member leg 19 may be provided with a coaxial bore 29. The bores 28 and 29 are also coaxial with the bore 17 in base 2. An optional flathead machine screw 30 may extend through bores 17 and 29 and may be threadedly engaged in bore 28 of support 4. The flathead screw 30 may be used to maintain the clamping screw support 4 in proper position during welding and will serve as reinforcement for the joinder of the clamping screw support 4 and the abutment member 3.

The clamping screw 5, itself, is conventional and is substantially identical to the clamping screw of a common C-clamp. To this end, the clamping screws comprises an elongated rod-like member which is externally threaded. At its lower end, the clamping screw 5 supports a clamping head 31 by means of a typical swivel connection 32. The clamping head 31 has a clamping surface 31*a*. At its upper end, the clamping screw 5 is provided with a transverse bore 33 so sized as to slidably receive a turning lever 34. The turning lever 34 is provided with enlarged ends 35 and 36 so as to be captively maintained in clamping screw bore 33.

It will be understood that when the clamping screw 5 is rotated in one direction, the clamping head 31 will be caused to shift toward the upper surface 7 of base 2. When rotated in the opposite direction, the clamping head 31 will shift away from the upper surface 7 of base 2. In this way, a workpiece may be supported on the upper surface 7 of base 2 and clamped in position thereon by clamping head 31. It would be within the scope of the present invention to make the base 2, the abutment member 3 and the clamping screw support 4 a single, integral, one-piece casting.

Figure 5:
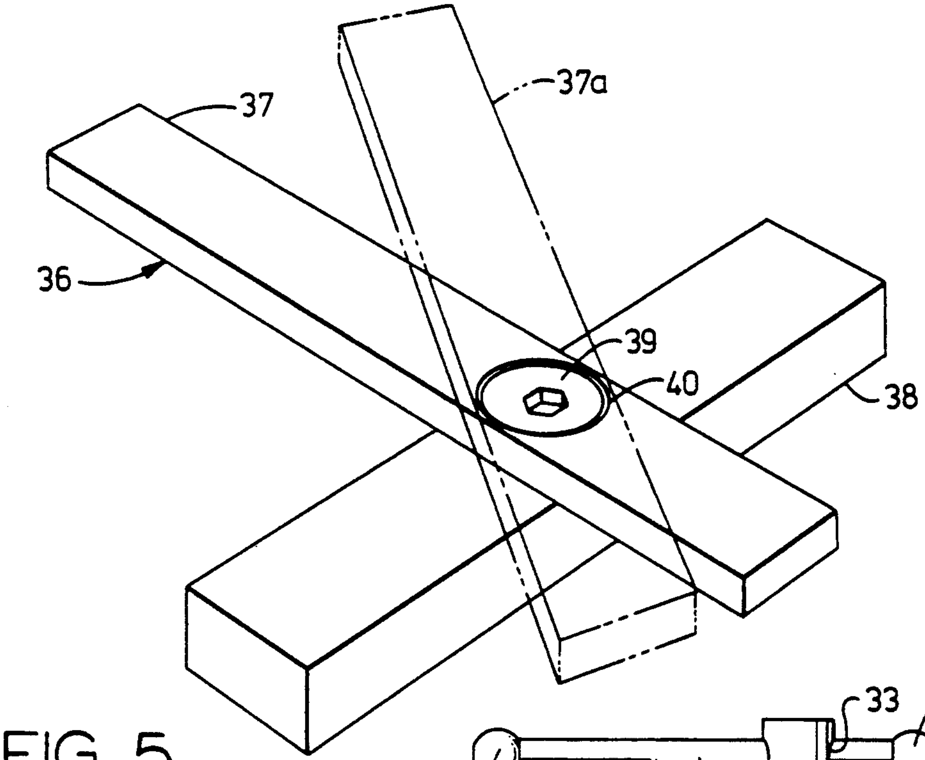
FIG. 5 is a perspective view of the T-guide, and illustrating in broken lines the long leg thereof in an adjusted position.

Reference is now made to FIG. 5 wherein the T-guide of the present invention is illustrated. The T-guide is generally indicated at 36. The T-guide comprises an upper bar 37 and a lower bar 38. The bars 37 and 38 may be made of any appropriate material such as metal, plastic, or the like. The bars 37 and 38 may be fixedly joined together, with upper bar 37 being perpendicular to lower bar 38. Preferably, however, the bars 37 and 38 are pivotally joined together by a flathead machine screw 39 which passes through a shouldered perforation 40 in upper bar 37 and is threadedly engaged in a threaded bore (not shown) in lower bar 38. When the flathead machine screw 39 is fully tightened, the rotative position of upper bar 37 with respect to lower bar 38 is fixed. In FIG. 5, the bars 37 and 38 are shown perpendicular with respect to each other. In broken lines, the upper bar 37 is shown at 37*a* in another adjusted angular relationship with respect to bar 38.

The upper bar 37 is so sized and shaped with respect to its cross-section that it is fully and slidably received in the slot 16 of the clamp 1, with a minimum of play. The lower bar 38 is so sized and shaped with respect to its cross-section that it may be fully and slidably received in a conventional guide slot in the table of an appropriate power tool such as a bandsaw, a belt sander, a disc sander, an edge sander, or the like.

Just such an instance is illustrated in FIG. 1. In FIG. 1 a belt edge sander is fragmentarily shown at 41 carrying a sanding belt 42. The belt sander is provided with a table 43 having a conventional guide slot 44 extending parallel to the supported flight of the sanding belt 42. It will be noted that the lower bar 38 of the T-guide 36 is slidably mounted in the guide slot 44 of table 43. Similarly, the upper bar 37 of the T-guide is slidably mounted in the slot 16 of clamp base 2. In the exemplary instance shown, the T-guide bars 37 and 38 are perpendicular with respect to each other and are maintained so either by being permanently affixed to each other, or by flathead machine screw 39. As a result of this arrangement, the long axis of the hold down clamp base 2 is oriented at 90° to the supported flight of the sanding belt 42 and will be maintained perpendicular to the supported flight of sanding belt 42 by the T-guide.

While oriented in this manner, the hold down . clamp 1 can be shifted longitudinally of table 43 in a direction parallel to table slot 44 and will be guided in this rectilinear movement by the lower bar 38 engaged in slot 44. At the same time, the hold down clamp 1 can be shifted toward and away from the supported flight of sanding belt 42 in a rectilinear path of travel perpendicular thereto, as guided by upper bar 37 engaged in hold down clamp base slot 16. Thus, the T-guide enables the hold down clamp 1 to have two distinct rectilinear guided paths of travel.

When bars 37 and 38 of T-guide 36 are joined together by flathead machine screw 39, the upper bar 37 of the T-guide can be oriented at a desired angle of other than 90° to the lower bar 38 (as shown in FIG. 5) and can be locked at that desired angularity by means of flathead machine screw 39. Under these circumstances, the hold down clamp 1 can again be shifted longitudinally of table 43, as guided by lower bar 38 of T-guide 36 located in table slot 44. The hold down clamp 1 can also be shifted toward and away from the supported surface of the sanding belt 42, but in this instance the axial movement of the hold down clamp base 2 will be at the desired and predetermined oblique angle with respect to table slot 44 and the supported surface of sanding belt 42. It will be understood that when upper bar 37 is adjusted to be parallel to lower bar 38, the upper bar 37 will overlie lower bar 38 and the paths of travel determined by the bars and their respective slots will be the same.

From the above it will be apparent that, when the T-guide is used, the hold down clamp and its workpiece can be shifted along two distinct rectilinear guided paths of travel. The first is determined by the engagement of the lower bar 38 in the table slot guide slot 44. The second is determined by the engagement of the upper bar 37 in the slot 16 of the hold down clamp base 2. In addition, however, the second guided path of travel may be adjusted with respect to the first guided path of travel by simply adjusting the rotative position of T-guide bar 37 with respect to T-guide bar 38 when the bars 37 and 38 are joined together by flathead machine screw 39.

When the T-guide is not used, the unobstructed planar bottom surface 6 of the hold down clamp base 2 rests upon the planar top surface of table 43 and is free floating thereon. In other words, the operator can manually shift the hold down clamp 1 and the workpiece along the top surface of table 43 in any direction and orientation. This is true with respect to any table of any appropriate power tool. Furthermore, when the T-guide is used with a table of another appropriate power tool such as a band saw, a drill press or the like, having a table with one or more guide slots, the mode of operation of the T-guide will be the same as described above.

Under some circumstances, it may be desired to use the hold down clamp of the present invention simply as a stationary clamp. To this end, the base 2 of the hold down clamp 1 may be removably affixed to any appropriate surface (such as the work surface of a work bench) by a pair of screws or bolts passing through perforations 12 and 13 in base 2.

Figure 7:
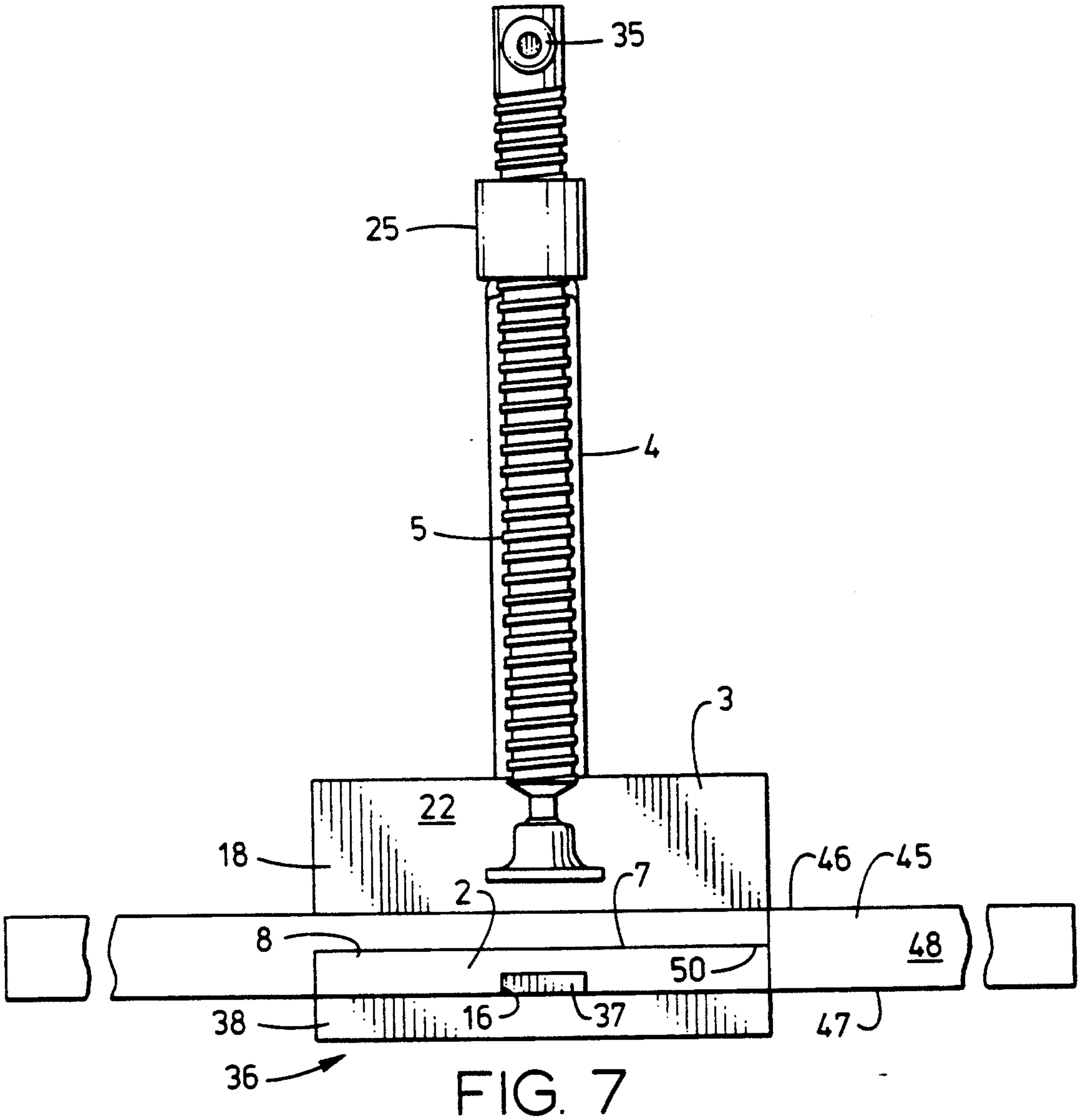
FIG. 7 is a fragmentary front elevational view of the hold down clamp, T-guide and the support and balance board.
Figure 4:
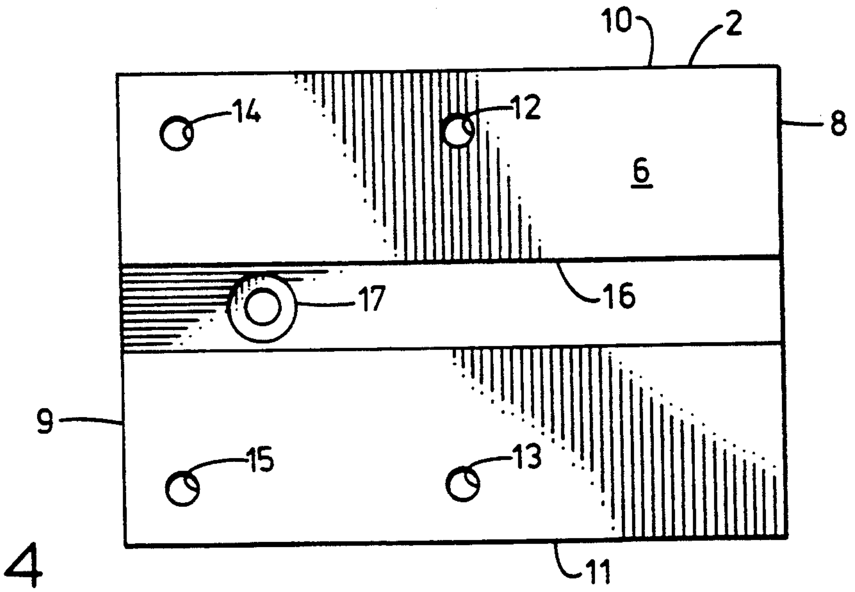
FIG. 4 is a bottom view of the hold down clamp.
Figure 6:
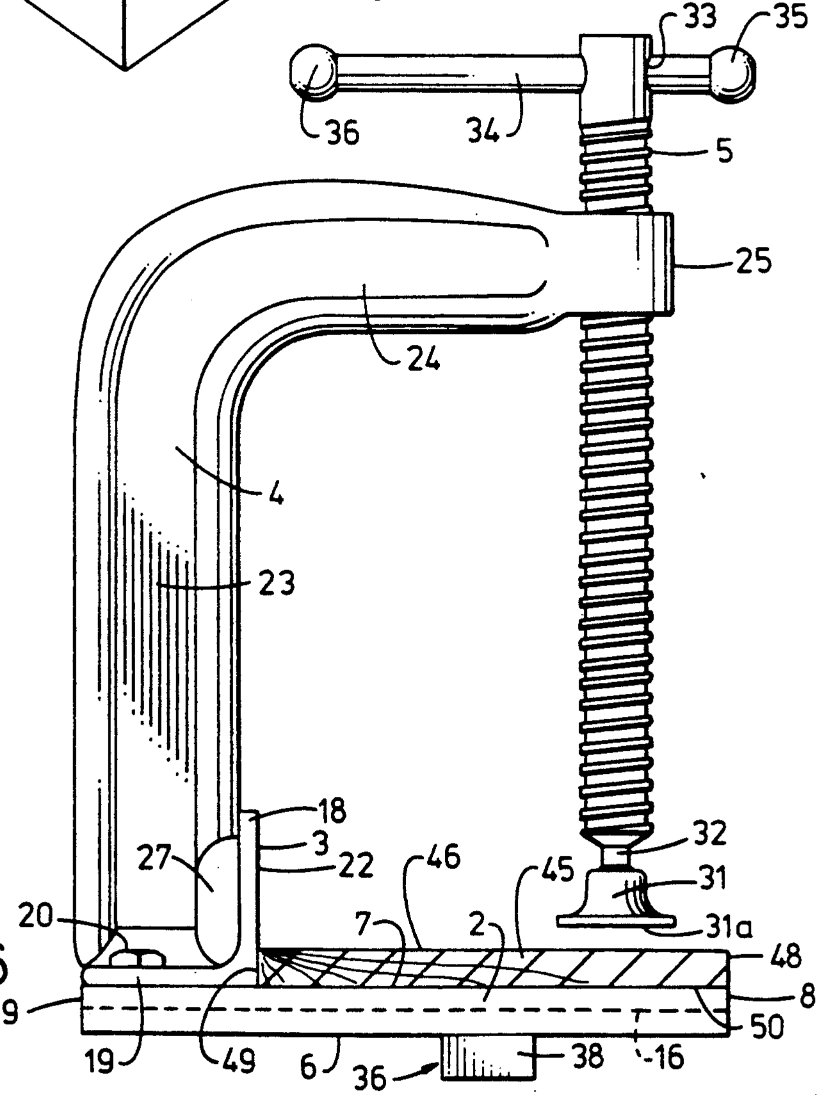
FIG. 6 is a side elevational view of the hold down clamp and T-guide with a support and balance board shown in cross-section mounted on the base of the hold-down clamp.

Reference is now made to FIGS. 6 and 7. A problem can be encountered if the hold down clamp of the present invention is required to clamp an elongated workpiece of such length as to significantly overhang the side edges 10 and 11 of base 2. For example, if it were desired to use a drill press to drill a hole in an end of the workpiece which overhangs the base 2, downward pressure of the drill bit might cause the workpiece to bend, or might result in a tilting of the hold down clamp base 2 with respect to the supporting surface upon which it rests. Either of these instances would result in a hole at the end of the workpiece, the axis of which would not be properly oriented. For these reasons, the hold down clamp of the present invention may be provided with a support and balance board 45 as shown in FIGS. 6 and 7. The support and balance board 45 may be made of any appropriate material such as metal, wood or plastic. For many operations, wood or plastic would be preferred. When using a drill press, for example, the drill bit can pass through the workpiece and into the support and balance board without harm to the drill bit.

The support and balance board comprises an elongated board having top and bottom surfaces 46 and 47 and parallel front and rear edges 48 and 49. The bottom surface 47 of the support and balance board 45 is provided with a central, transverse slot 50 so dimensioned as to just nicely receive the base 2 of hold down clamp 1. As is apparent from FIGS. 6 and 7, when the support and balance board 45 is mounted on the base 2 of hold down clamp 1, the bottom surface 47 of the support and balance board is coplanar with the bottom surface 6 of base 2. The rearward edge 49 of the support and balance board abuts the surface 18 of abutment member 3 and the front edge 48 of the support and balance board is substantially coplanar with the forward edge 8 of base 2. The upper surface 46 of the support and balance board 45 provides a workpiece holding surface with which the clamping head 31 of clamping screw 5 cooperates. Support and balance board 45 simply provides a laterally extended the support surface for the hold down clamp to prevent problems of the general type set forth above.

Modifications may be made in the invention without departing from the spirit of it.

The foregoing description of a preferred embodiment of the invention has ben presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. In combination with a table of a power tool, a multi-purpose hold down clamp comprising a plate-like base having substantially planar top and bottom surfaces, a forward edge, a rearward edge and side edges, a clamping screw support having a vertical portion and a horizontal portion, said vertical portion having a lower end affixed to said base near said rearward base edge and centered between said base sides, said vertical portion having an upper end from which said horizontal portion extends forwardly toward said forward base edge and spaced upwardly from said base upper surface, said horizontal portion having an enlarged free end, said enlarged end having a vertical internally threaded bore therethrough, a vertical clamping screw engaged in said support bore and having at its lower end a clamping head having a clamping surface adapted to cooperate with said base top surface to clamp a workpiece therebetween, said table having at least one rectilinear guide slot formed therein, said bottom surface of said clamp base having a rectilinear slot formed therein and extending centrally thereof from said base forward edge through said base rearward edge, a T-guide comprising upper and lower rectilinear bars, said upper bar overlying said lower bar and being joined at its longitudinal center to said lower bar near one end thereof, said lower bar being slidably receivable in said table guide slot, said upper bar being slidably receivable in said slot in said clamp base, said clamp being shiftable along said table in a first guided rectilinear path of travel determined by said lower bar in said table guide slot, said clamp being simultaneously shiftable along said table in a second guided path of travel determined by said upper bar in said base slot.

2. A multi-purpose hold down clamp comprising a plate-like base having substantially planar top and bottom surfaces, a forward edge, a rearward edge and side edges, a clamping screw support having a vertical portion and a horizontal portion, said vertical portion having a lower end affixed to said base near said rearward base edge and centered between said base sides, said vertical portion having an upper end from which said horizontal portion extends forwardly toward said forward base edge and spaced upwardly from said base upper surface, said horizontal portion having an enlarged free end, said enlarged end having a vertical internally threaded bore therethrough, a vertical clamping screw engaged in said support bore and having a t its lower end a clamping head having a clamping surface adapted to cooperate with said base top surface to clamp a workpiece therebetween, a support and balance board, said board comprising an elongated member having a planar top surface, a planar bottom surface, a front edge, a rear edge and side edges, the long dimension of said board extending between its side edges, said board bottom surface having a transverse slot formed therein, extending from said front edge through said rear edge and centered between said board side edges, said board being mountable on said clamp base with said clamp base being received within said board slot, said front edge of said board being substantially coplanar with said base forward edge and said board bottom surface being coplanar with said base bottom surface, said top surface of said board cooperating with said clamping screw clamping surface to clamp and support a workpiece so sized and shaped that said workpiece significantly overhangs at least one of said clamp base side edges.

3. The clamp claimed in claim 1 wherein said clamp base planar bottom surface is free of downwardly depending obstructions whereby said clamp can be manually shifted along a work surface in a free floating manner.

4. The clamp claimed in claim 1 including means on said base by which said clamp can be removably fixed to a work surface by removable fastening means.

5. The clamp claimed in claim 1 including an abutment means with a forwardly facing abutment surface extending transversely of said top surface of said base just in front of said vertical portion of said clamping screw support.

6. The clamp claimed in claim 1 wherein said joinder of said upper bar to said lower bar of said T-guide is fixed, whereby the direction of said second path of travel is fixed with respect to said first path of travel and said table slot.

7. The clamp claimed in claim 1 wherein said joinder of said upper bar to said lower bar of said T-guide is rotatably adjustable, whereby the direction of said second path of travel is angularly adjustable with respect to said first path of travel and said table slot.

8. The clamp claimed in claim 1 including a support and balance board, said board comprising an elongated member having a planar top surface, a planar bottom surface, a forward edge, a rearward edge and side edges, the long dimension of said board extending between its side edges, said board bottom surface having a transverse slot formed therein, extending from said forward edge through said rearward edge and centered between said board side edges, said board being mountable on said clamp base with said clamp base forward of said vertical abutment surface being received within said board slot, said rearward edge of said board abutting said vertical abutment surface, said forward edge of said board being substantially coplanar with said base forward edge and said board bottom surface being coplanar with said base bottom surface, said to surface of said board cooperating with said clamping screw clamping surface to clamp and support a workpiece so sized and shaped that said workpiece significantly overhangs at lest one of said clamp base side edges.

9. The clamp claimed in claim 1 wherein said clamp base bottom surface is free of downwardly depending obstructions whereby, in the absence of said T-guide, said clamp can be manually shifted along said table and other appropriate work surfaces in a free floating manner.

10. The clamp claimed in claim 1 including means on said base by which, in the absence of said T-guide, said clamp can be removably fixed to a work surface by removable fastening means.

11. The clamp claimed in claim 5 wherein said abutment means comprises an angle iron member having a horizontal leg supported by sand affixed to said top surface of said base and a vertical leg providing said forwardly facing vertical abutment surface, said lower end of said vertical portion of said clamping screw support being affixed to said angle iron legs.

12. The clamp claimed in claim 5 wherein said base, said abutment means and said clamping screw support constitute a one-piece, integral structure.

13. The clamp claimed in claim 5 including a support and balance board, said board comprising an elongated member having a planar top surface, a planar bottom surface, a front edge, a rear edge and side edges, the long dimension of said board extending between its side edges, said board bottom surface having a transverse slot formed therein, extending from said front edge through said rear edge and centered between said board side edges, said board being mountable on said clamp base with said clamp base being received within said board slot, said front edge of said board being substantially coplanar with said base forward edge and said board bottom surface being coplanar with said base bottom surface, said top surface of said board cooperating with said clamping screw clamping surface to clamp and support a workpiece so sized and shaped that said workpiece significantly overhangs at least one of said clamp base side edges.

14. A multi-purpose hold down clamp comprising a plate-like base having planar top and bottom surfaces, a forward edge, a rearward edge and side edges, clamping means supported on said top surface of said base, a table of a power tool, said table having at least one rectilinear guide slot formed therein, said bottom surface of said clamp base having a rectilinear slot formed therein and extending centrally thereof from said base forward edge through said base rearward edge, a T-guide comprising upper and lower rectilinear bars, said upper bar overlying said lower bar and being joined at its longitudinal center to said lower bar near one end thereof, said lower bar being slidably receivable in said table guide slot, said upper bar being slidably receivable in said slot in said clamp base, said clamp being shiftable along said table in a first guided rectilinear path of travel determined by said lower bar in said table guide slot, said clamp being simultaneously shiftable along said table in a second guided path of travel determined by said upper bar in said base slot.

15. The clamp claimed in claim 14 wherein said joinder of said upper bar to said lower bar of said T-guide is fixed, whereby the direction of said second path of travel is fixed with respect to said first path of travel and said table slot.

16. The clamp claimed in claim 14 wherein said joinder of said upper bar to said lower bar of said T-guide is rotatably adjustable, whereby the direction of said second path of travel is angularly adjustable with respect to said first path of travel and said table slot.

17. The clamp claimed in claim 14 including a support and balance board, said board comprising an elongated member having a planar top surface, a planar bottom surface, a front edge, a rear edge and side edges, the long dimension of said board extending between its side edges, said board bottom surface having a transverse slot formed therein, extending from said front edge through said rear edge and centered between said board side edges, said board being mountable on said clamp base with said clamp base forward of said vertical abutment surface being received within said board slot, said rear edge of said board abutting said vertical abutment surface, said front edge of said board being substantially coplanar with said base forward edge and said board bottom surface being coplanar with said base bottom surface, said top surface of said board cooperating with said clamping screw clamping surface to clamp and support a workpiece so sized and shaped that said workpiece significantly overhangs at lest one of said clamp base side edges.

18. The clamp claimed in claim 14 wherein said clamp base bottom surface is free of downwardly depending obstructions whereby, in the absence of said T-guide, said clamp can be manually shifted along said table and other appropriate work surfaces in a free floating manner.

19. The clamp claimed in claim 14 including means on said base by which, in the absence of said T-guide, said clamp can be removably fixed to a work surface by removable fastening means.

* * * * *